US008473164B2

(12) United States Patent
Charnesky et al.

(10) Patent No.: US 8,473,164 B2
(45) Date of Patent: Jun. 25, 2013

(54) SHUTTER WITH OFFSET LOUVER PIVOT

(75) Inventors: Scott P. Charnesky, Birmingham, MI (US); Brian D. Van Buren, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 400 days.

(21) Appl. No.: 12/759,038

(22) Filed: Apr. 13, 2010

(65) Prior Publication Data
US 2011/0251761 A1    Oct. 13, 2011

(51) Int. Cl.
*G06F 7/00* (2006.01)

(52) U.S. Cl.
USPC ............ 701/49; 123/41.04; 165/98; 236/35.2

(58) Field of Classification Search
USPC .................. 701/49; 49/79.1, 74.1, 77.1, 80.1, 49/81.1; 454/75, 152, 155; 180/68.1, 68.6, 180/68.3, 68.4; 29/897.15; 165/98; 123/41.04, 123/41.05, 41.06, 41.49; 293/115; 236/35.2
See application file for complete search history.

(56) References Cited

U.S. PATENT DOCUMENTS

| 4,457,558 | A  | * | 7/1984  | Ishikawa ..................... 296/180.5 |
|-----------|----|---|---------|------------------------------------------|
| 4,779,577 | A  | * | 10/1988 | Ritter et al. ................ 123/41.05 |
| 6,918,456 | B2 | * | 7/2005  | Dennison et al. ............ 180/68.1    |
| 7,498,926 | B2 | * | 3/2009  | Browne et al. ............. 340/425.5    |
| 7,766,111 | B2 | * | 8/2010  | Guilfoyle et al. ............ 180/68.1   |
| 2006/0102339 | A1 | * | 5/2006 | Cherewyk ..................... 166/202   |
| 2010/0243352 | A1 | * | 9/2010 | Watanabe et al. ............ 180/68.1    |
| 2011/0005851 | A1 | * | 1/2011 | Doroghazi et al. .......... 180/68.1     |
| 2011/0070817 | A1 | * | 3/2011 | Walters ........................ 454/155 |

* cited by examiner

*Primary Examiner* — Marthe Marc-Coleman
(74) *Attorney, Agent, or Firm* — Quinn Law Group, PLLC

(57) ABSTRACT

A shutter system for controlling an airstream through a grille opening in a vehicle includes a plurality of louvers. Each louver has a pivot axis, and a louver face offset from the pivot axis. The shutter system also includes a mechanism configured to select a position for the shutter system by rotating each of the plurality of louvers about its respective pivot axis. Each of the plurality of louvers rotates in tandem with every other of the plurality of louvers during the selection of the position for the shutter system. The louver face of each of the plurality of louvers is rotated to a position parallel to the airstream when the shutter system is fully opened, is positioned to restrict the airstream through the grille opening when the shutter system is partially closed, and is positioned immediately adjacent to the grille opening when the shutter system is fully closed.

16 Claims, 4 Drawing Sheets

SHUTTER WITH OFFSET LOUVER PIVOT

TECHNICAL FIELD

The invention relates to a shutter of the type including pivoting louvers for controlling and directing an airstream.

BACKGROUND OF THE INVENTION

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

SUMMARY OF THE INVENTION

A shutter system for controlling an airstream through a grille opening in a vehicle includes a plurality of louvers. Each louver has a pivot axis, and a louver face offset from the pivot axis. The shutter system also includes a mechanism configured to select a position for the shutter system between and inclusive of fully opened and fully closed by rotating each of the plurality of louvers about its respective pivot axis. Each of the plurality of louvers rotates in tandem, i.e., largely in unison, with every other of the plurality of louvers during the selection of the position for the shutter system. The louver face of each of the plurality of louvers is rotated to a position parallel to the airstream when the shutter system is fully opened, is positioned to restrict the airstream through the grille opening when the shutter system is partially closed, and is positioned immediately adjacent to the grille opening when the shutter system is fully closed.

Each of the plurality of louvers may overlap and partially nest inside an adjacent louver when the shutter system is closed to thereby provide a seamless blockage of the grille opening. The shutter system may further include a controller configured to regulate the mechanism.

The subject vehicle may include an internal combustion engine, and the controller may be configured to regulate the mechanism according to a load on the engine. The engine may be cooled by a fluid circulated through a heat exchanger, and the vehicle may include a sensor to sense a temperature of the fluid and configured to communicate the temperature to the controller. The controller may be configured to regulate the mechanism to cool the fluid circulated through the radiator according to the sensed temperature of the fluid.

A vehicle employing the shutter system described above, as well as a method for controlling an airstream through a screened grille opening in such a vehicle, is also disclosed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
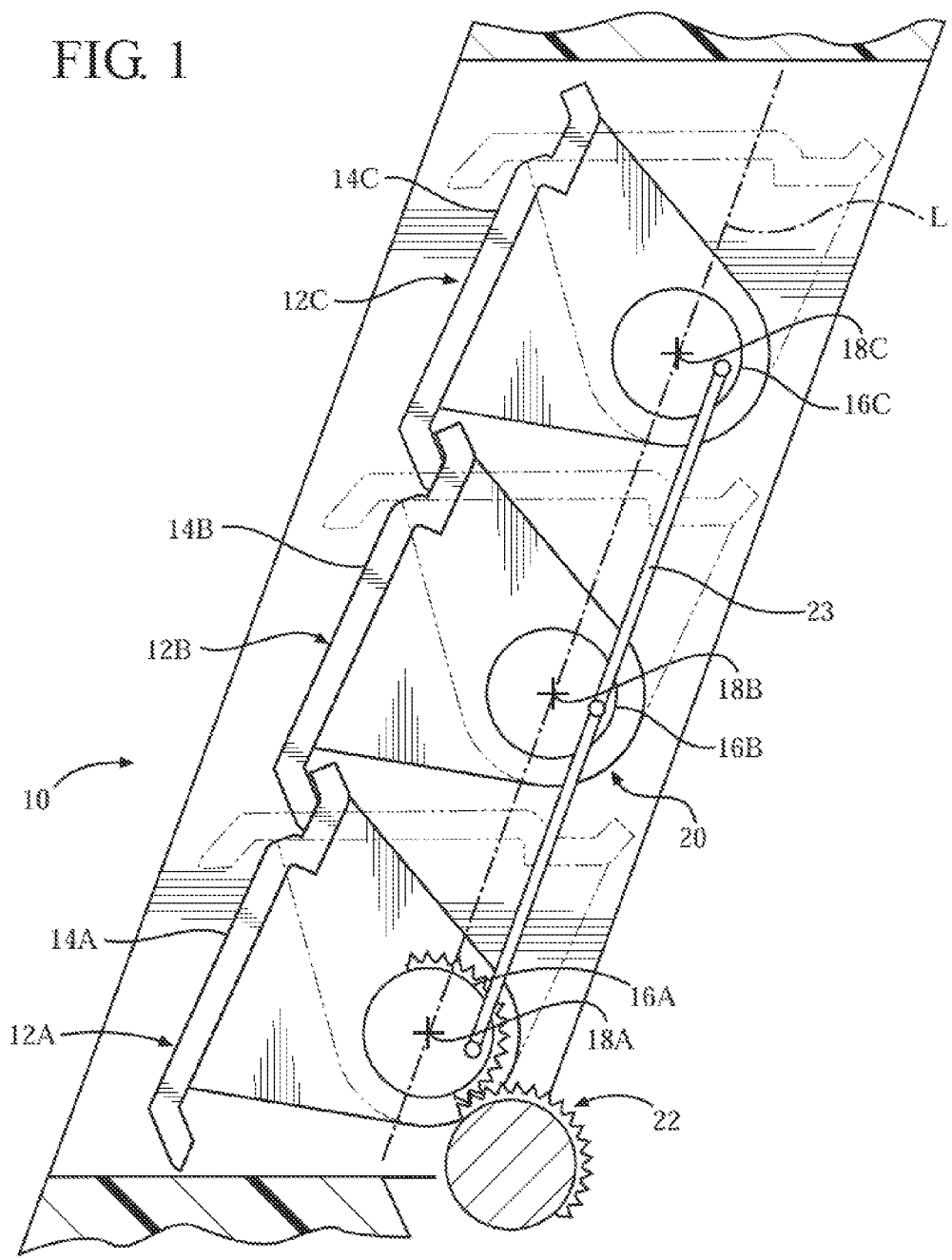
FIG. 1 is a side view of a shutter system.

Referring to the drawings, wherein like reference numbers refer to like components, FIG. 1 shows a shutter system 10. Shutter system 10 includes a plurality of louvers, herein shown as having three individual louver elements 12A, 12B, and 12C, but the number of louvers may either be fewer or greater. Each louver 12A-C is characterized by a respective louver face 14A-C, and a pivot 16A-C. Each respective pivot 16A-C is characterized by a respective pivot axis 18A-C. Each louver 12A-C is configured to rotate about each respective pivot axis 18A-C during operation of the shutter system 10. The louver face 14A-C of each respective louver 12A-C is offset by a distance D1 from each respective pivot axis 16A-C. Because louver faces 14A-C are offset by distance D1 from each respective pivot axis 16A-C, the louvers 12A-C only swing out a relatively short distance D2 from their fully closed to their fully opened position. Each respective pivot axis 16A-C is shown as generally disposed along, i.e., aligned, on a line L.

Shutter system 10 also includes a mechanism 20, having a gear drive 22, configured to select a desired position for the shutter system between and inclusive of fully opened and fully closed. Gear drive 22 is shown as incorporating pivot 16A of louver 12A, thereby making louver 12A the driving louver element. Mechanism 20 is also shown to include linkage 23, which is configured to transfer rotational motion from gear drive 22 to each individual pivot 16A-C. The resultant rotation of pivots 16A-C about pivot axes 18A-C causes louvers 12A-C to rotate in tandem, i.e., substantially in unison, and permitting the shutter system 10 to rotate into any of the available positions. Mechanism 20 acts to select the desired position for the shutter system 10 when activated by any external means, as understood by those skilled in the art, such as an electric motor (not shown).

Figure 2:
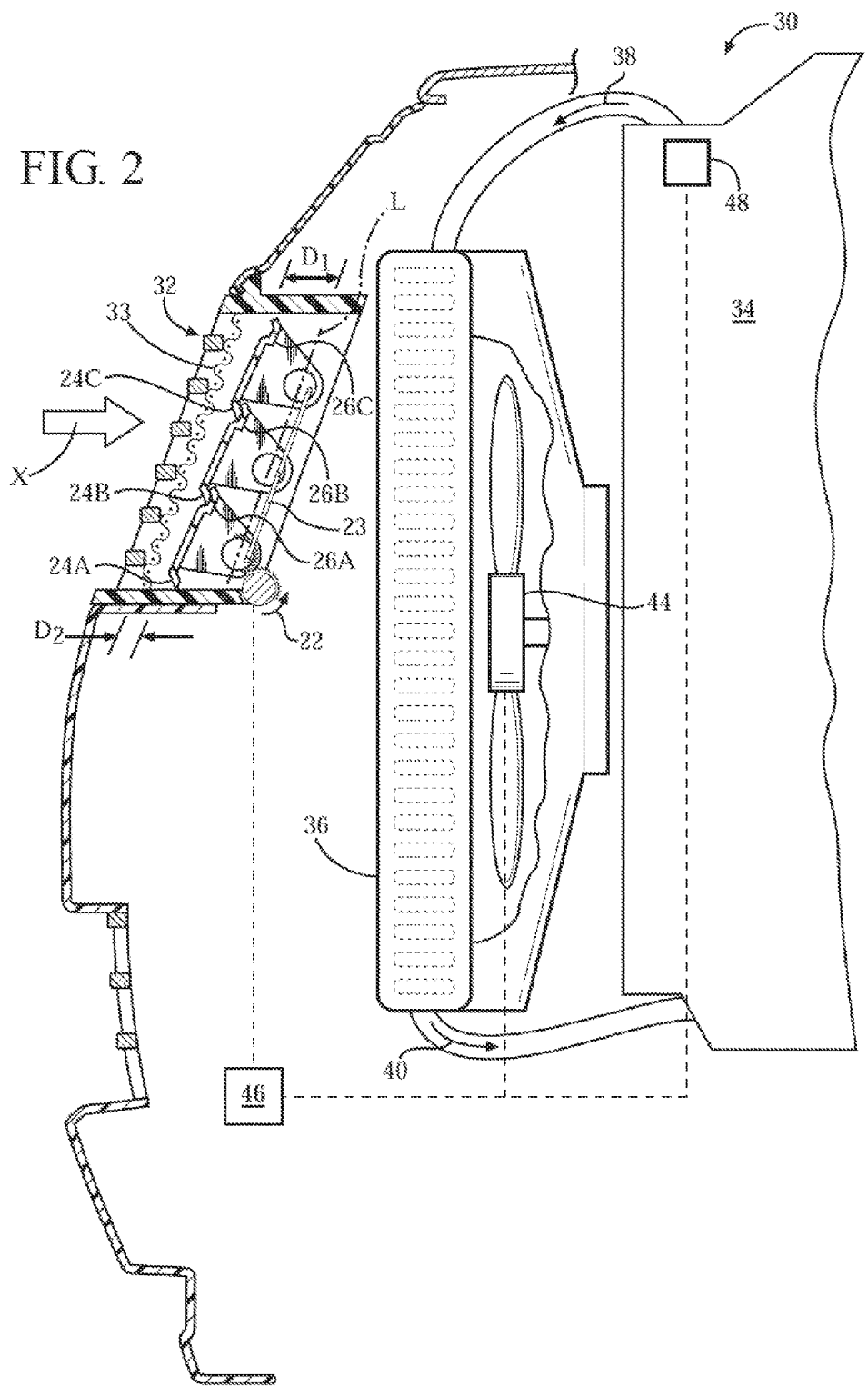
FIG. 2 is a partial side view of a vehicle having the shutter system shown in FIG. 1, the shutter system depicted in a fully closed state.

FIG. 2 depicts shutter system 10 incorporated inside a vehicle 30. As shown shutter system 10 is positioned behind, and immediately adjacent to a grille opening 32 having a grille mesh 33 arranged at the front of the vehicle 30. The shutter system 10 may thus be positioned adjacent to the grille opening 32 and immediately behind the grille mesh 33 because louver faces 14A-C are offset by distance D1 from each respective pivot axis 18A-C, and the louvers 12A-C only swing out a relatively short distance D2 from their fully closed to their fully opened position. Vehicle 30 includes an internal combustion engine 34. Also included is an air-to-fluid heat exchanger 36, i.e., a radiator, for circulating a cooling fluid, shown by arrows 38 and 40, such as water or a specially formulated coolant, for cooling engine 34. Heat exchanger 36 is positioned behind the grille opening 32, behind the grille mesh 33, and behind shutter system 10 for protection of the heat exchanger from various road- and airborne debris. The heat exchanger 34 may also be positioned in any other location, such as behind a passenger compartment, if, for example, the vehicle has a rear or a mid-engine configuration, as understood by those skilled in the art.

A fan 44 is positioned behind the heat exchanger 36. Fan 44 may be driven either electrically, or mechanically, directly by the engine. Vehicle 30 also includes a controller 46, which may be an engine controller or a separate control unit, configured to regulate mechanism 20 for selecting the desired position of the shutter system 10. Controller 46 may also be configured to operate the fan 44, if the fan is electrically driven, and a thermostat (not shown) that is configured to regulate the circulation of coolant, as understood by those skilled in the art.

Vehicle 30 additionally includes a coolant sensor 48 configured to sense a temperature of the coolant. Controller 46 is programmed to regulate mechanism 20 according to the load on engine 34 and, correspondingly, on the temperature of the coolant sensed by sensor 48. The temperature of the coolant is increased due to the heat produced by engine 34 under load. As known by those skilled in the art, a load on the engine is typically dependent on operating conditions imposed on the vehicle 30, such as going up a hill and/or pulling a trailer. The load on engine 34 generally drives up internal temperature of the engine, which in turn necessitates cooling of the engine for desired performance and reliability.

The coolant is routed inside the engine 34 in order to most effectively remove heat from critical engine components, such as bearings (not shown, but known by those skilled in the art). Typically, the coolant is continuously circulated by a fluid pump (not shown) from engine 34 to heat exchanger 36. In a moving vehicle, an airstream X at ambient temperature and traveling at a certain velocity with respect to the vehicle penetrates the vehicle's grille opening 32. When shutter system 10 is open, the airstream X penetrates the shutter system plane before coming into contact with the heat exchanger 36. As the airstream X reaches the heat exchanger 36, the coolant temperature inside the heat exchanger is reduced before the coolant is returned to the engine 34, to thereby cool the engine.

When the shutter system 10 is fully closed, as depicted in FIG. 1, louver faces 14A-C become disposed substantially parallel to line L, thus forming a plane of closed louvers. In the fully closed position, each of the louvers 12A-C overlaps and partially nests inside an adjacent louver when the shutter system is closed, to thereby provide a seamless blockage of the airstream X at the grille opening 32. For the purpose of providing the overlapping and partially nesting interconnection of adjacent louvers, each louver 12A-C includes a respective slanted edge 24A-C, and a respective indented edge 26A-C. For example, as can be seen from FIG. 2, when the shutter system 10 is fully closed, an adjacent slanted edge 24B is nested inside the complementary indented edge 26A, thereby providing a seamless closure plane between louvers 12A and 12B. A fully closed shutter system 10 provides optimized aerodynamics for vehicle 30 when engine cooling through the grille opening 32 is not required.

Figure 3:
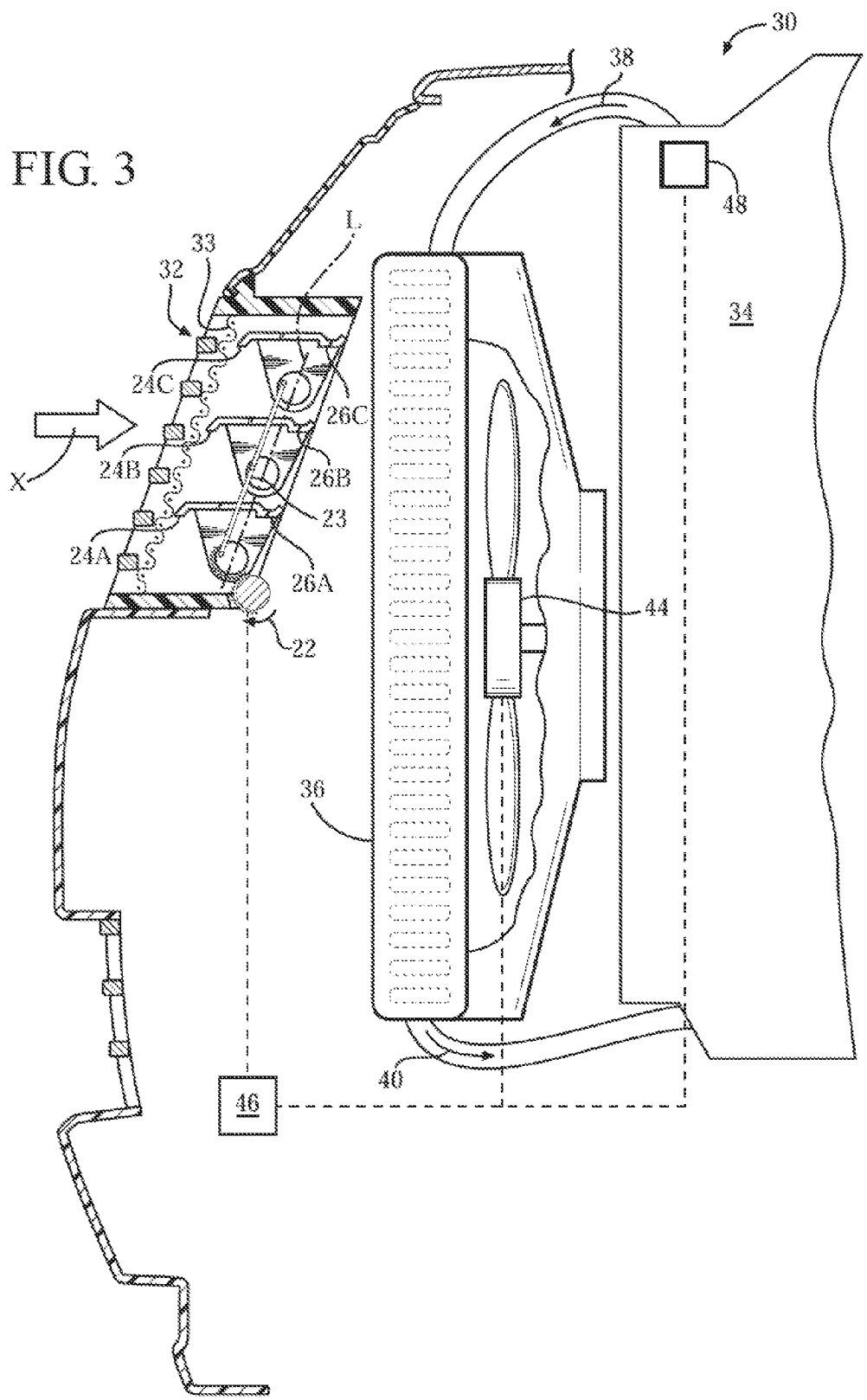
FIG. 3 is a partial side view of a vehicle having the shutter system shown in FIG. 1, the shutter system depicted in a fully opened state.

When the shutter system 10 is fully opened, as shown in FIG. 3, each louver face 14A-C is rotated to a position parallel to the airstream X seeking to penetrate the shutter system plane. Thus, a fully opened shutter system 10 is configured to permit a generally unfettered passage of such a stream through the louver plane. The shutter system 10 may also be regulated by controller 46 to variably restrict access of the oncoming airstream X to heat exchanger 36, by rotating louvers 12A-C to an intermediate position, where the louvers are partially closed. An appropriate intermediate position of louvers 12A-C is selected by the controller 46 according to a programmed algorithm to thereby affect the desired cooling of engine 34. Although partially closed louvers 12A-C are not specifically shown, such a position is readily understood by those skilled in the art.

Figure 4:
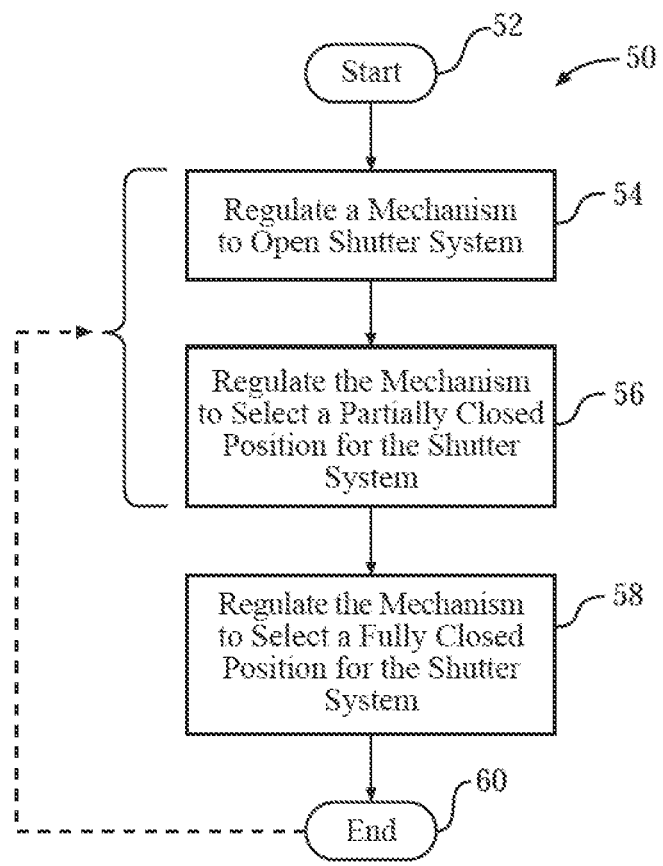
FIG. 4 is a flow chart illustrating a method for controlling an airstream through a grille opening in the vehicle depicted in FIGS. 2 and 3.

FIG. 4 depicts a method 50 for controlling the airstream X through grille opening 32 in vehicle 30 via shutter system 10, as described above with respect to FIGS. 2 and 3. The method commences in frame 52 and then proceeds to frame 54 where the mechanism 22 is regulated by controller 46 to select the fully opened position for shutter system 10 and permit full access of the airstream X to heat exchanger 36. Following frame 54, the method advances to frame 56 where the mechanism 22 is regulated by controller 46 to select the partially closed position for shutter system 10 and permit restricted access of the airstream X from the grille opening 32 to heat exchanger 36. Following frame 56, the method proceeds to frame 58, where mechanism 22 is regulated by controller 46 to select the fully closed position for shutter system 10, and close off access of the airstream X to heat exchanger 36 by positioning louver faces 14A-C immediately adjacent to grille opening 32. Following frame 58, the method may loop back to either frame 54 or frame 56 to continue regulating mechanism 22 according to cooling requirements of engine 34, or proceed to frame 60 where the method is completed.

While the best modes for carrying out the invention have been described in detail, those familiar with the art to which this invention relates will recognize various alternative designs and embodiments for practicing the invention within the scope of the appended claims.

The invention claimed is:

1. A shutter system for controlling an airstream through a grille opening having a grille mesh in a vehicle, the shutter system comprising:
   a plurality of louvers, each louver having a pivot axis and a louver face, wherein each louver face is offset from its respective pivot axis; and
   a mechanism configured to select a position for the shutter system between and inclusive of fully opened and fully closed by rotating each of the plurality of louvers about its respective pivot axis;
   wherein:
      each of the plurality of louvers rotates in tandem with every other one of the plurality of louvers during the selection of the position for the shutter system;
      the louver face of each of the plurality of louvers is rotated to a position parallel to the airstream when the shutter system is fully opened, is positioned to restrict the airstream through the grille opening when the shutter system is partially closed, and is positioned adjacent to the grille opening and immediately behind the grille mesh when the shutter system is fully closed; and
      the louver face of each of the plurality of louvers is offset by a first distance from the respective pivot axis such that each of the louvers swings out toward the grille mesh a relatively shorter second distance from the louver's fully closed to the louver's fully opened position.

2. The shutter system of claim 1, wherein each of the plurality of louvers includes a slanted leading edge and an indented trailing edge configured to accept and nest the slanted leading edge of an adjacent louver of the plurality of louvers such that each of the plurality of louvers overlaps and partially nests inside the adjacent louver when the shutter system is closed to thereby provide a seamless blockage of the grille opening.

3. The shutter system of claim 1, further comprising a controller configured to regulate the mechanism.

4. The shutter system of claim 3, wherein the vehicle includes an internal combustion engine, and the controller is configured to regulate the mechanism according to a load on the engine.

5. The shutter system of claim 4, wherein the engine is cooled by a fluid circulated through a heat exchanger, and the vehicle includes a sensor to sense a temperature of the fluid and configured to communicate the temperature to the controller.

6. The shutter system of claim 5, wherein the controller is configured to regulate the mechanism to cool the fluid circulated through the heat exchanger according to the sensed temperature of the fluid.

7. A vehicle comprising:
an internal combustion engine cooled by a circulating fluid;
a heat exchanger configured to cool the fluid via an airstream after the fluid cools the engine;
a grille opening positioned to permit the airstream to pass through on the way to the heat exchanger and having a grille mesh;
a shutter system for controlling the airstream through the grille opening, the shutter system having a plurality of louvers, each louver having a pivot axis and a louver face offset from the pivot axis; and
a mechanism configured to select a position for the shutter system between and inclusive of fully opened and fully closed by rotating each of the plurality of louvers about its respective pivot axis;
wherein:
each of the plurality of louvers rotates in tandem with every other of the plurality of louvers during the selection of the position for the shutter system;
the louver face of each of the plurality of louvers is rotated to a position parallel to the airstream when the shutter system is fully opened, is positioned to restrict the airstream through the grille opening when the shutter system is partially closed, and is positioned immediately adjacent to the grille opening and immediately behind the grille mesh when the shutter system is fully closed; and
the louver face of each of the plurality of louvers is offset by a first distance from the respective pivot axis such that each of the louvers swings out toward the grille mesh a relatively shorter second distance from the louver's fully closed to the louver's fully opened position.

8. The vehicle of claim 7, wherein each of the plurality of louvers includes a slanted leading edge and an indented trailing edge configured to accept and nest the slanted leading edge of an adjacent louver of the plurality of louvers such that each of the plurality of louvers overlaps and partially nests inside the adjacent louver when the shutter system is closed to thereby provide a seamless blockage of the grille opening.

9. The vehicle of claim 7, further comprising a controller configured to regulate the mechanism.

10. The vehicle of claim 9, wherein the controller is configured to regulate the mechanism according to a load on the engine.

11. The vehicle of claim 9, wherein the engine is cooled by a fluid circulated through a heat exchanger, and the vehicle includes a sensor to sense a temperature of the fluid and configured to communicate the temperature to the controller.

12. The vehicle of claim 11, wherein the controller is configured to regulate the mechanism to cool the fluid circulated through the heat exchanger according to the sensed temperature of the fluid.

13. A method for controlling an airstream through a grille opening having a grille mesh in a vehicle, the method comprising:
regulating a mechanism by a programmable controller to select a fully opened position for a shutter system, the shutter system having a plurality of louvers, each louver having a pivot axis and a louver face offset by a first distance from the respective pivot axis, wherein the shutter system is configured to be positioned between and inclusive of fully opened and fully closed by rotating each of the plurality of louvers about its respective pivot axis, such that each of the plurality of louvers rotates in tandem with every other one of the plurality of louvers during the selection of the position, the mechanism thereby rotating the louver face of each of the plurality of louvers to a position parallel to the airstream when the shutter system is fully opened;
regulating the mechanism to select a partially closed position for the shutter system, thereby positioning the louver face of each of the plurality of louvers to restrict the airstream through the grille opening; and
regulating the mechanism to select a fully closed position for the shutter system, wherein each of the louvers swings out toward the grille mesh a relatively shorter second distance from the louver's fully closed to the louver's fully opened position, thereby positioning the louver face of each of the plurality of louvers adjacent to the grille opening and immediately behind the grille mesh.

14. The method of claim 13, wherein each of the plurality of louvers includes a slanted leading edge and an indented trailing edge configured to accept and nest the slanted leading edge of an adjacent louver of the plurality of louvers, further comprising overlapping and partially nesting each of the plurality of louvers inside an adjacent louver of the plurality of louvers when the shutter system is closed to thereby provide a seamless blockage of the grille opening.

15. The method of claim 13, wherein the vehicle includes an internal combustion engine, and said regulating of the mechanism by the controller is accomplished according to a load on the engine.

16. The method of claim 13, wherein the engine is cooled by a fluid circulated through a heat exchanger and a sensor configured to sense a temperature of the fluid, and said regulating of the mechanism by the controller is accomplished according to the sensed temperature.

* * * * *